(12) United States Patent
Birch et al.

(10) Patent No.: US 7,886,418 B2
(45) Date of Patent: Feb. 15, 2011

(54) METHOD AND APPARATUS FOR MOBILE BLIND INSTALLATION

(75) Inventors: Clifford Birch, Summerfield, NC (US); Sherry Soden, Greensboro, NC (US); Thomas Caputo, Greensboro, NC (US)

(73) Assignee: Newell Window Furnishings, Inc., High Point, NC (US)

( * ) Notice: Subject to any disclaimer, the term of this patent is extended or adjusted under 35 U.S.C. 154(b) by 1068 days.

(21) Appl. No.: 11/530,155

(22) Filed: Sep. 8, 2006

(65) Prior Publication Data
US 2008/0066283 A1 Mar. 20, 2008

(51) Int. Cl.
B23P 13/00 (2006.01)
B60P 3/14 (2006.01)

(52) U.S. Cl. .................. 29/407.05; 29/428; 29/24.5; 296/24.32

(58) Field of Classification Search .............. 296/24.32, 296/24.39, 24.4, 24.44; 29/24.5, 407.05, 29/428
See application file for complete search history.

(56) References Cited

U.S. PATENT DOCUMENTS

| | | | |
|---|---|---|---|
| 2,365,940 A | 12/1944 | Couse | |
| 2,811,111 A | 10/1957 | Levitz et al. | |
| 3,633,970 A | 1/1972 | Langhals | |
| 3,807,788 A | 4/1974 | Radek | |
| 4,055,206 A | 10/1977 | Griffin | |
| 4,114,266 A * | 9/1978 | Erpenbeck | 30/123 |
| 4,403,415 A * | 9/1983 | Kufrin | 30/96 |
| 4,516,308 A | 5/1985 | Urban | |
| 4,589,313 A | 5/1986 | Meyers et al. | |
| 4,616,870 A | 10/1986 | Halden | |
| 4,730,372 A | 3/1988 | Tsuchida | |
| 4,897,122 A * | 1/1990 | Schreiber et al. | 134/29 |
| 4,907,325 A | 3/1990 | Hsu | |
| 5,108,122 A | 4/1992 | Beagley | |
| 5,135,277 A | 8/1992 | Pearson | |
| 5,239,934 A | 8/1993 | Miller et al. | |
| 5,310,209 A | 5/1994 | Holman | |
| 5,339,716 A * | 8/1994 | Sands et al. | 83/452 |
| 5,365,013 A | 11/1994 | Aulson | |
| 5,791,713 A | 8/1998 | Dubuc | |
| 5,799,557 A * | 9/1998 | Wang | 83/639.5 |
| 6,089,134 A | 7/2000 | Marocco | |
| 6,167,789 B1 | 1/2001 | Daniels et al. | |
| 6,325,435 B1 | 12/2001 | Dubuc | |
| 6,334,379 B1 | 1/2002 | Sudano | |
| 6,585,305 B2 | 7/2003 | Nazginov et al. | |
| 6,612,008 B1 | 9/2003 | Thoma | |
| 6,817,653 B2 | 11/2004 | Ropp | |
| 6,969,102 B2 * | 11/2005 | Orischak et al. | 296/24.32 |

(Continued)

Primary Examiner—Jermie E Cozart
(74) Attorney, Agent, or Firm—Dennis J. Williamson; Moore & Van Allen, PLLC

(57) ABSTRACT

The apparatus comprises a vehicle in which a blind cutting machine is installed. A supply of blinds in different sizes, styles, fabrics and finishes is also maintained in the vehicle. The vehicle travels to the customer premise. Once the blind is selected by the customer, the installer measures the architectural feature to be covered to determine the final dimensions of the blind. The installer then cuts the selected blind to the desired size using the cutting machine. After the blind is cut to the proper size, it is mounted on the architectural feature. The selection, measurement, sizing and installation of the blind are accomplished during a single visit to the customer premise.

26 Claims, 4 Drawing Sheets

U.S. PATENT DOCUMENTS

| | | |
|---|---|---|
| 6,973,364 B2 | 12/2005 | Schwartz et al. |
| 7,059,230 B2 | 6/2006 | Caputo et al. |
| 7,114,421 B2 * | 10/2006 | Marocco ................ 83/13 |
| 7,178,439 B2 | 2/2007 | Gilboy et al. |
| 2003/0178868 A1 | 9/2003 | Lapsley |
| 2003/0213345 A1 | 11/2003 | Roberts et al. |
| 2004/0140683 A1 | 7/2004 | Orischak et al. |
| 2005/0127698 A1 | 6/2005 | Baum |
| 2005/0179276 A1 | 8/2005 | Morello |

* cited by examiner

METHOD AND APPARATUS FOR MOBILE BLIND INSTALLATION

The invention relates generally to cut-to-size window coverings and more particularly to a method and apparatus for providing mobile cut-to-size installation at a customer premise.

BACKGROUND OF THE INVENTION

It will be appreciated that that window blinds come in a variety of materials including wood, plastic, fabric, vinyl and aluminum and a variety of styles including horizontal, vertical, woven, pleated, Roman and cellular. Blinds are sold as stock, custom and cut-to-size or size-in-store. Stock blinds are manufactured in a variety of standard widths that are intended to fit corresponding standard window sizes. Custom blinds are manufactured to specified dimensions per a customer's specific request. Cut-to-size or size-in-store blinds are manufactured in a limited number of sizes that are intended to be used with a wide range of window sizes. A cutting machine is provided at the retail outlet that cuts the blind from the manufactured size to the customer's desired size. The cutting machine can be operated by the retail outlet personnel and is simple enough to operate with little training.

Retail sales methods vary with the type of blind. Stock blinds are typically sold in retail settings such as home centers where the customer purchases the blind in the size closest to the window being covered and takes the blind from the retail outlet. Stock blinds are also sold via mail order where the customer orders a specific stock blind style and size. The blind retailer ships the corresponding blind to the customer premise. Typically, stock blinds are installed by the customer although some retail outlets provide installation services where the customer, after purchasing the blind, may separately order installation. If installation is ordered, a day and time is arranged and the installer comes to the customer premise at the appointed time and installs the previously purchased stock blind. Stock blinds are the least expensive form of window covering but they may not fit all windows properly. Moreover, stock blinds are typically installed by the customer where the installation may be difficult for some customers. Where installation is separately ordered, the installation of the blind is delayed from the time of purchase until arrangements are made for the installer to visit the customer premise.

Custom blinds are built to specific customer specifications and typically require that the window dimensions be provided to the blind manufacturer for the customer's windows. The blind manufacturer builds the blind in the style requested by the customer and to the specific dimensions of the customer's window. The window measurements may be taken by the customer or the blind manufacturer may have a representative that comes to the customer premise and takes the measurements. As with stock blinds, customers may separately order installation where an installer visits the customer's premise after the custom blinds have been manufactured and delivered to the customer premise. Custom blinds are relatively expensive because they are custom made and not mass produced. Custom blinds also require the longest lead time for installation because they require separate ordering of the blind including taking and submitting window measurements, manufacture of the blind, delivery of the blind to the customer premise and installation. In some cases custom blinds may require two or three interactions between the retailer and customer for ordering, measurement, delivery and installation.

Size-in-Store blinds are relatively less expensive than custom blinds and can be dimensioned to properly fit more windows sizes than stock blinds. Size-in-store blinds require that each retail outlet has a size-in-store cutting machine specifically designed to cut the blinds. Each retail outlet typically employs an individual trained to use the size-in-store machine. To purchase the blinds, the customer must first accurately measure the window to be covered. The customer then takes the window measurements to a retail outlet equipped with a cutting machine. The customer purchases a blind suitable for use with the measured window. The retail outlet employee uses the size-in-store machine to cut the blind to the desired size based on the customer's measured window dimensions. The customer takes the cut blind to their premise and installs the blind. While the size-in-store blind system presents an option to customers, it requires that the customer travel to a retail outlet to purchase the blinds. It also relies on the customer's ability to accurately measure the window and the retail outlet employee's availability and ability to accurately cut the blind. Installation is also left to the customer.

An improved method and apparatus for sizing and installing blinds at a customer premise is desired.

SUMMARY OF THE INVENTION

The invention comprises a mobile blind sizing apparatus for cut-to-size blinds and a method of selling and the blinds at a customer premise. The apparatus comprises a vehicle such as a truck or van in which a blind cutting machine is installed. A supply of cut-to-size blinds in different sizes, styles, fabrics and finishes is also maintained in the vehicle. The vehicle is also equipped with a generator for powering the cutting machine and work stations for otherwise sizing and preparing the blinds.

A customer contacts the blind installer such as through a web page access, phone connection or otherwise. The customer sets up an appointment for the installer to come to the customer premise. During this initial contact the customer may provide details as to specifics of the installation job. For example, if the customer is interested in specific types of blinds, specific colors or the like the customer can preselect the blinds. During this contact the customer may also identify the number of architectural features to be covered. The customer can also use this initial contact to obtain information from the installer as to cost, installation details and the like. During this initial contact the installer may also obtain customer information such as customer premise address, billing information or the like.

The installer travels to the customer premise at the appointed time in the vehicle of the invention. The installer and customer may review the blind inventory in the vehicle to make a final selection as to the desired blind. Once the blind is selected by the customer, the installer measures the architectural feature to be covered to determine the final dimensions of the blind. The operator then cuts the selected blind to the desired size using the cutting machine. For horizontal blinds the width of the blind is cut and for vertical blinds the length of the blind is cut. Once the blind is cut to the proper size, the operator installs the blind in the customer premise.

The selection, measurement, sizing and installation of the blind are accomplished during a single appointment and at the customer premise.

DETAILED DESCRIPTION OF EMBODIMENTS OF THE INVENTION

In this application the term "architectural feature" is used to refer to any architectural feature that may be covered by a blind such as windows, doors, doorways, openings, alcoves or the like. The term "blind" or "blinds" refers to any window covering that can be cut to size to fit an architectural feature including slatted blinds, mini-blinds, cellular shades, vertical or horizontal blinds, woven or fabric or the like. In this application the terms "size-in-store" and "cut-to-size" refer to blinds that are manufactured in a predetermined width that are intended to be cut-to-size to fit a particular size architectural feature. The blinds are intentionally manufactured in a size that is wider than the architectural feature for which the blind is intended to be used. It will be appreciated that size-in-store blinds may come in a limited number of different widths where each width is intended to be used with a range of architectural feature widths. This is done to minimize the waste that would result if only a single large width blind was used that had to be cut down to fit even the smallest architectural feature. Whether a single size blind is provided or several blind sizes are provided, a significant feature of these blinds is that they are designed to be cut to the desired size at the retail level. The term "customer" refers to the individual or other entity that orders a blind. The term "Installer" means the individual, combination of individuals or entity responsible for operating the vehicle of the invention, taking orders, sizing and installing the blind.

Figure 1:
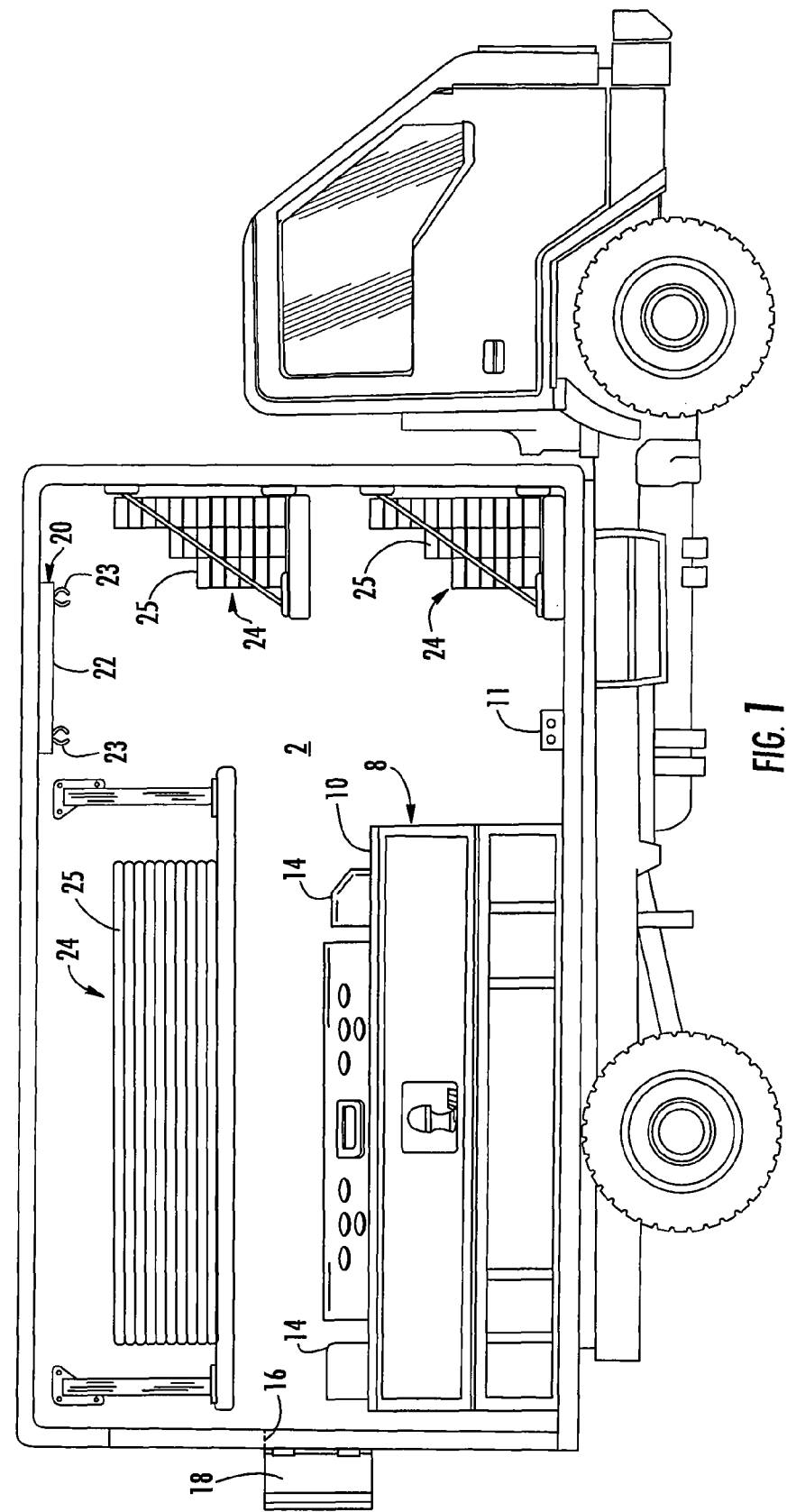
FIGS. 1 and 2 are partially cut-away side views of an embodiment of a vehicle for use in implementing the invention.
Figure 2:
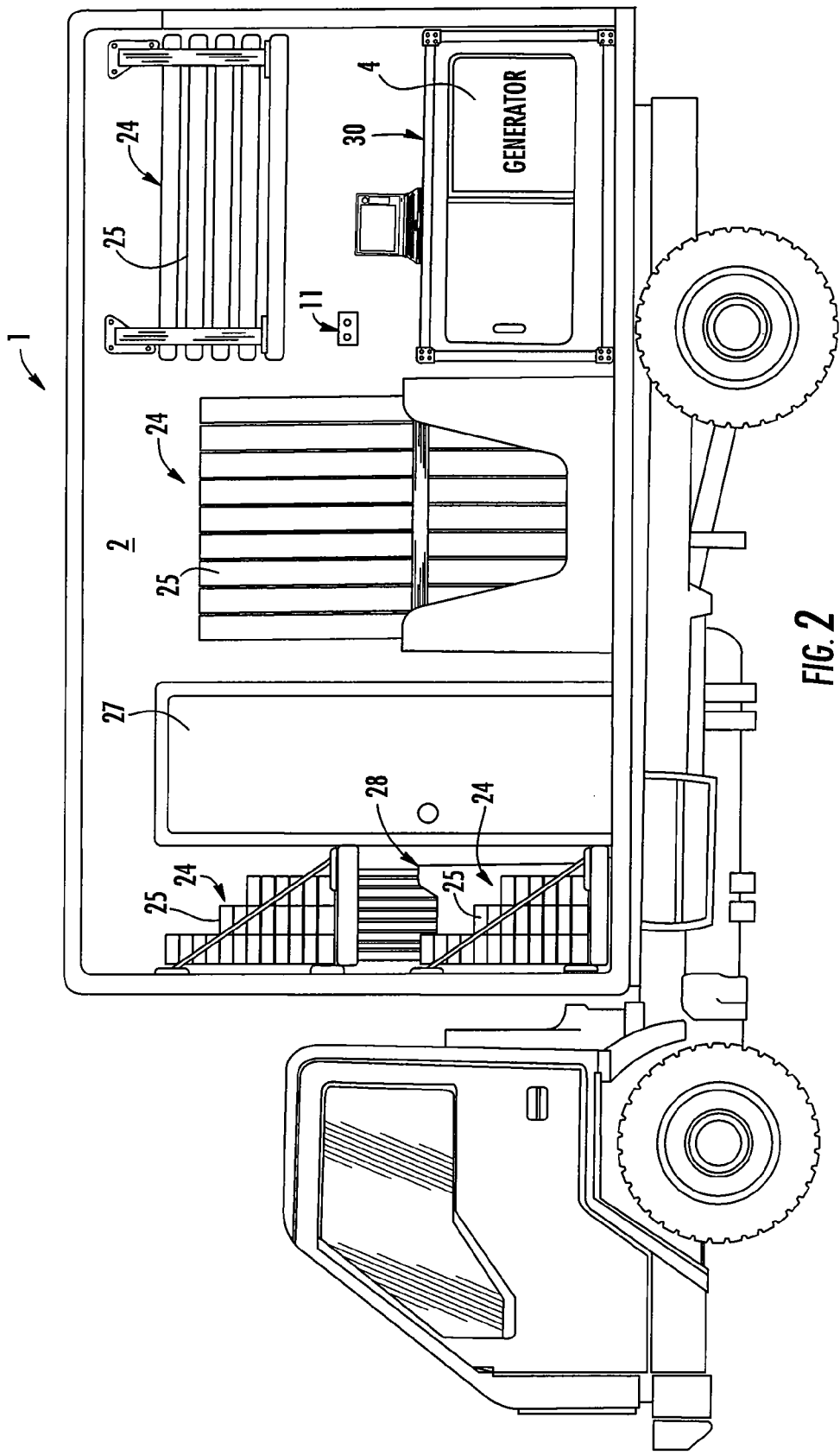
Figure 3:
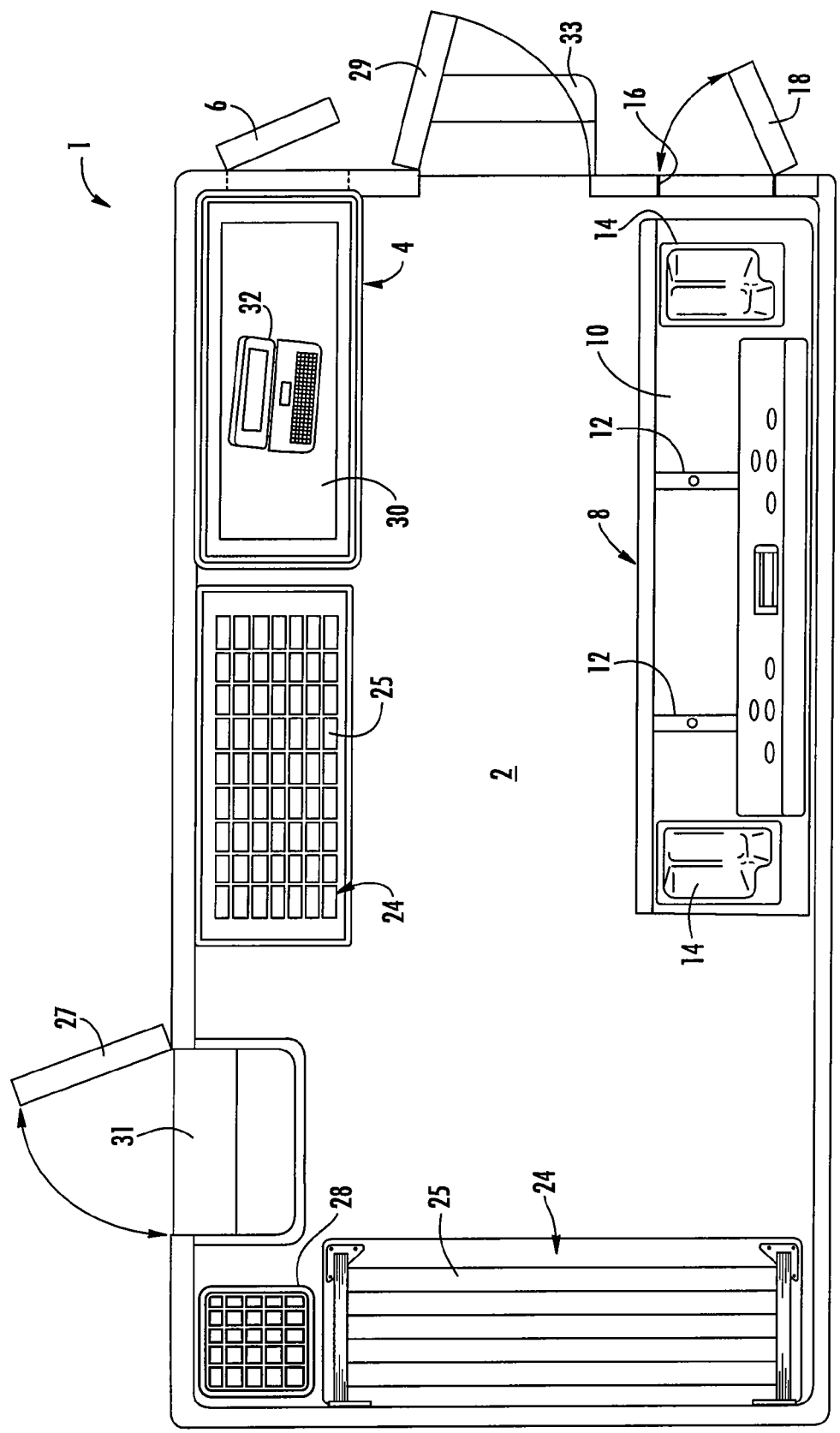
FIG. 3 is a partially cut-away top view of an embodiment of a vehicle for use in implementing the invention.

Referring to FIGS. 1, 2 and 3, the vehicle of the invention is shown generally at 1. While the vehicle 1 is shown as a panel truck it will be appreciated that other types of vehicles such as vans are also suitable. The vehicle 1 of the invention comprises a standard vehicle configuration such that it can be driven to and from the customer premise. The details of the vehicle, except as specifically modified for the implementation of the invention, are not described in detail herein it being understood that the structure and operation of such vehicles are well known.

The storage area 2 of vehicle 1 is modified so as to be suitable for use as a mobile size-in-store operation. An electric power generator 4 is mounted in the storage area of the vehicle that provides the energy for powering the size-in-store machine 8, lighting, HVAC and power outlets 11. In one embodiment the generator is accessible from the exterior of the vehicle through a vented door 6.

Along one wall of the storage area 2 is located the cutting machine 8 for cutting the blinds to the desired size. Such cutting machines are known and are used to cut size-in-store products in retail outlets, examples of which are described in U.S. Pat. No. 5,339,716 issued Aug. 23, 1994 to Sands et al.; U.S. Pat. No. 6,314,851 issued Nov. 13, 2001 to Graves et al.; U.S. Pat. No. 6,167,789 issued Jan. 2, 2001 to Daniels et al.; U.S. Pat. No. 5,072,494 issued Dec. 17, 1991 to Graves et al. and U.S. Pat. No. 4,993,131 issued Feb. 19, 1991 to Graves et al., the disclosures of which are incorporated herein by reference. A typical cutting machine 8 includes a platform 10 for supporting the blind to be cut. The cutting machine 8 may also use clamping and locating devices 12 for holding the blind in position during the cutting operation. The cutting machine 8 includes a blade or saw (not shown) mounted in a blade housing 14 for cutting the ends of the blinds, in the case of horizontal blinds, or for cutting the bottoms of the blinds, in the case of vertical blinds. The blades and saws may be manually operated or electrically powered. Automated cutting machines are known that automatically cut the blinds to the correct size based on data input by the operator. The cutting machine may include two cutting blades such that both ends of the blind can be cut simultaneously.

An opening 16 is located in the back wall of the vehicle 1 immediately adjacent to the cutting machine 8 to allow access to the cutting machine from the exterior of storage area 2. It will be appreciated that some blind styles are manufactured in lengths that are so long that the blinds cannot easily be placed into the cutting machine 8 within the storage area 2. Opening 16 allows passage from the outside of the vehicle to the storage area 2 through opening 16 such that long blinds can be inserted into the vehicle from outside the vehicle to greatly facilitate the loading of the size-in-store machine 8. The opening 16 is arranged at the end of the machine 8 such that the blinds can be inserted through the opening lengthwise and inserted directly onto the platform 10. The blinds may extend out of the opening when being cut. A door 18 closes opening 16 when not in use.

The vehicle 1 further includes doors 27 and 29 allowing entrance to and egress from the storage area 2 for both the installer and customer. Suitable steps 31 and 33 may also be provided to facilitate entrance and egress.

The vehicle 1 is also provided with a station 20 for adjusting the length of a horizontal the blind. Specifically a fixture 22 is provided with releasable clamps 23 from which a blind may be hung. The blind is extended from the fixture and the desired length of the blind is measured. The bottom rail of the blind is removed. Slats are then removed from the blind or the blind material is otherwise shortened. The lift and tilt cords are then be shortened and reattached to the bottom rail to complete the assembly as is known in the art.

Storage areas 24 are also provided for storing the blind inventory 25. The blinds may be displayed such that the customer may view the various styles, colors and materials. A sample book, brochures, sample decks and sample blinds may be displayed to facilitate the customer's review of the available blind styles. Additional storage areas 28 and a work table 30 may also be provided. The blind inventory may also be stored in a separate vehicle such as a towed trailer.

Figure 4:
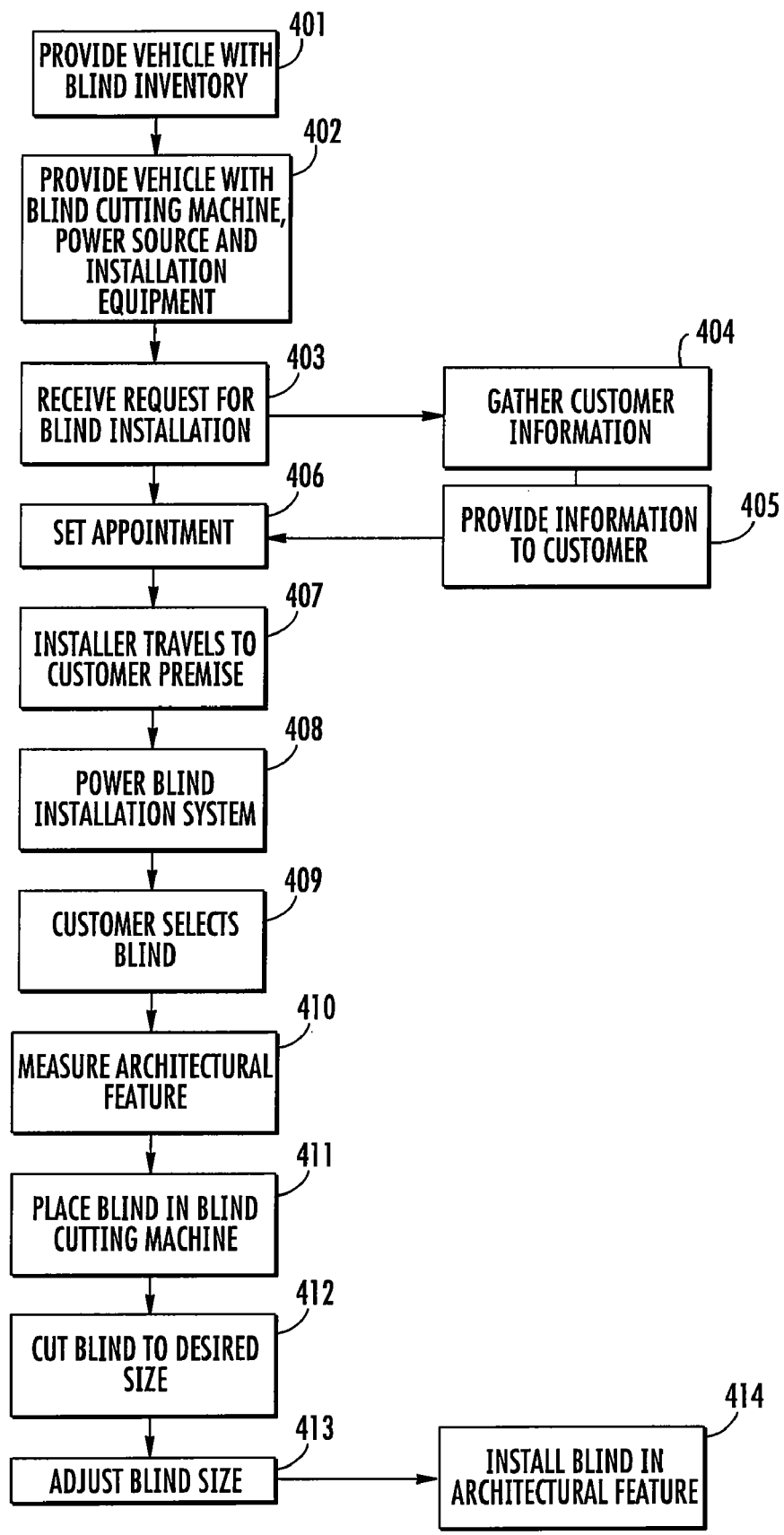
FIG. 4 is a flow chart showing the method of the invention.

The operation of the method of the invention will be described with reference to FIG. 4. The vehicle is provided with an inventory of blinds (block 401) and a blind cutting machine, installation stations and power source as previously described (block 402). The installer receives a request from a customer for a blind installation (block 403). The request may be by telephone, web page, mail order or other communication means. In one embodiment the vehicle 1 may include a wireless terminal 32 such as a wireless phone or a wireless enabled computer such that the customer request may be transmitted directly to the vehicle 1. The installer may gather specific customer information such as customer premise address, particular blind styles, colors or the like and/or the number of architectural features to be covered and the features' approximate dimensions (block 404). The installer may also provide information to the customer such as cost estimates or the like (block 405). The customer and installer set an appointment time for the installer to arrive at the customer premise (block 406).

At the appointed time the installer arrives at the customer premise in the vehicle (block 407). The vehicle is parked at the customer premise and the generator is used to provide electricity to the vehicle to power cutting machine 8, lighting, HVAC systems and electrical outlets 11 (block 408).

The customer selects the style of blinds to be installed from the inventory maintained in the vehicle and the type of mount (e.g. inside mount or outside mount) (block 409). Once the blinds are selected the installer measures the dimensions of the relevant architectural features at the customer premise (block 410).

The installer places the selected blind in the cutting machine 8 (block 411). The blind may be inserted through door 18 if the blind is too long to be easily placed within the cutting machine 8 from inside the storage area 2. The blind is cut by the cutting machine 8 to the desired size (block 412). In the case of horizontal blinds the width of the blinds are cut to size and in the case of vertical blinds the length of the blinds are cut to size. The operation of the cutting machine 8 is known and the blind may be cut automatically where the installer inputs the desired final dimensions or the blind may be cut manually where the installer manually measures and cuts the blinds. The opposite ends of the blinds may be cut simultaneously or first one end of the blind may be cut and then the other end of the blind may be cut.

The blinds may also be adjusted for length in the case of horizontal blinds or width as in the case with vertical blinds (block 413). It is known to adjust the length of horizontal blinds by hanging the fully extended blind, measuring the desired length of the blind, removing the bottom rail and a selected number of slats, shortening the lift and tilt cords and resecuring the bottom rail to the shortened cords. Station 20 is provided in vehicle 1 for making this adjustment where the head rail of the blind may be secured to clamps 23 of fixture 22. The fixture temporarily supports the blind while the above-described adjustment is made. A similar adjustment may be made on vertical blinds by removing a selected number of the vertical vanes to shorten the width of the blind.

Once the blind is properly sized, the installer installs the properly sized blind on the corresponding architectural feature at the customer premise (block 414). The vehicles carries an inventory of window hardware such as mounting brackets, fasteners, tilt rods and the like. The vehicle also carries the necessary hand tools for completing the installation such as drills, power drivers and the like. These tools, which may be battery operated, may be charged in the vehicle using the electric power supplied by generator 4. One method of installing blinds comprises providing a vehicle; providing a plurality of blinds in the vehicle; providing a blind cutting machine in the vehicle; visiting a customer premise with the vehicle; and cutting one of the plurality of blinds in the cutting machine.

The entire installation of a cut to size blind may be accomplished in a single customer premise visit from the selection of the blinds, through sizing and installation. Payment may also be accomplished during the customer premise visit. In addition to blinds, the system of the invention may also be used to install associated products such as drapery rods, drapery products and the like.

Specific embodiments of an invention are disclosed herein. One of ordinary skill in the art will recognize that the invention has other applications in other environments. Many embodiments are possible. The following claims are in no way intended to limit the scope of the invention to the specific embodiments described above.

The invention claimed is:

1. A mobile blind installation apparatus comprising:
a vehicle;
a plurality of blinds in said vehicle; and
a blind cutting machine in said vehicle, said blind cutting machine comprising means for cutting said plurality of blinds to a desired size.

2. The apparatus of claim 1 wherein said vehicle includes a source of power for powering the blind cutting machine.

3. The apparatus of claim 2 wherein the source of power comprises a generator on the vehicle.

4. The apparatus of claim 1 further including an opening allowing blind access to the blind cutting machine from the exterior of the vehicle wherein the opening is located immediately adjacent the blind cutting machine to provide access to the blind cutting machine from the exterior of the vehicle.

5. The apparatus of claim 1 wherein the vehicle includes a wireless terminal.

6. The apparatus of claim 1 wherein the blind cutting machine is automated.

7. The apparatus of claim 1 wherein the vehicle includes a fixture from which a blind may be hung.

8. The apparatus of claim 7 wherein the fixture includes clamps.

9. A method of sizing and installing blinds comprising:
providing a vehicle;
providing a plurality of blinds in said vehicle;
providing a blind cutting machine in said vehicle;
visiting a customer premise with said vehicle;
measuring a dimension of an architectural feature;
cutting one of said plurality of blinds in said cutting machine to fit said dimension; and
installing said one of said plurality of blinds in said architectural feature.

10. The method of claim 9 wherein said plurality of blinds includes at least two different types of blinds.

11. The method of claim 9 wherein said plurality of blinds includes slatted horizontal blinds.

12. The method of claim 9 wherein said plurality of blinds includes cellular shades.

13. The method of claim 9 wherein said plurality of blinds includes woven blinds.

14. The method of claim 9 wherein said plurality of blinds includes vertical blinds.

15. The method of claim 9 further including receiving a request for blind installation for the customer premise.

16. The method of claim 15 wherein the request includes customer information.

17. The method of claim 16 wherein the customer information includes an address of the customer premise.

18. The method of claim 16 wherein the customer information includes information about a selected blind.

19. The method of claim 16 wherein the customer information includes information about the architectural feature.

20. The method of claim 9 wherein the step of cutting includes the step of loading a blind into the cutting machine.

21. The method of claim 9 wherein the step of loading includes the step of loading the cutting machine through an opening from outside the vehicle.

22. The method of claim 9 further including adjusting the length of the blind.

23. The method of claim 22 further including temporarily hanging the blind in said vehicle.

24. The method of claim 9 wherein the steps of cutting and installing the blind are performed in a single visit to the customer premise.

25. A method of installing blinds comprising:
providing a vehicle;
providing a plurality of blinds in said vehicle;
providing a blind cutting machine in said vehicle;
visiting a customer premise with said vehicle;
cutting one of said plurality of blinds in said cutting machine to a size corresponding to adimension of an architectural feature.

26. The method of claim 25 further comprising measuring the dimension.

* * * * *